Feb. 20, 1934.　　　L. F. W. LEESE　　　1,947,529
RECOVERY OF SULPHUR
Filed Dec. 8, 1932
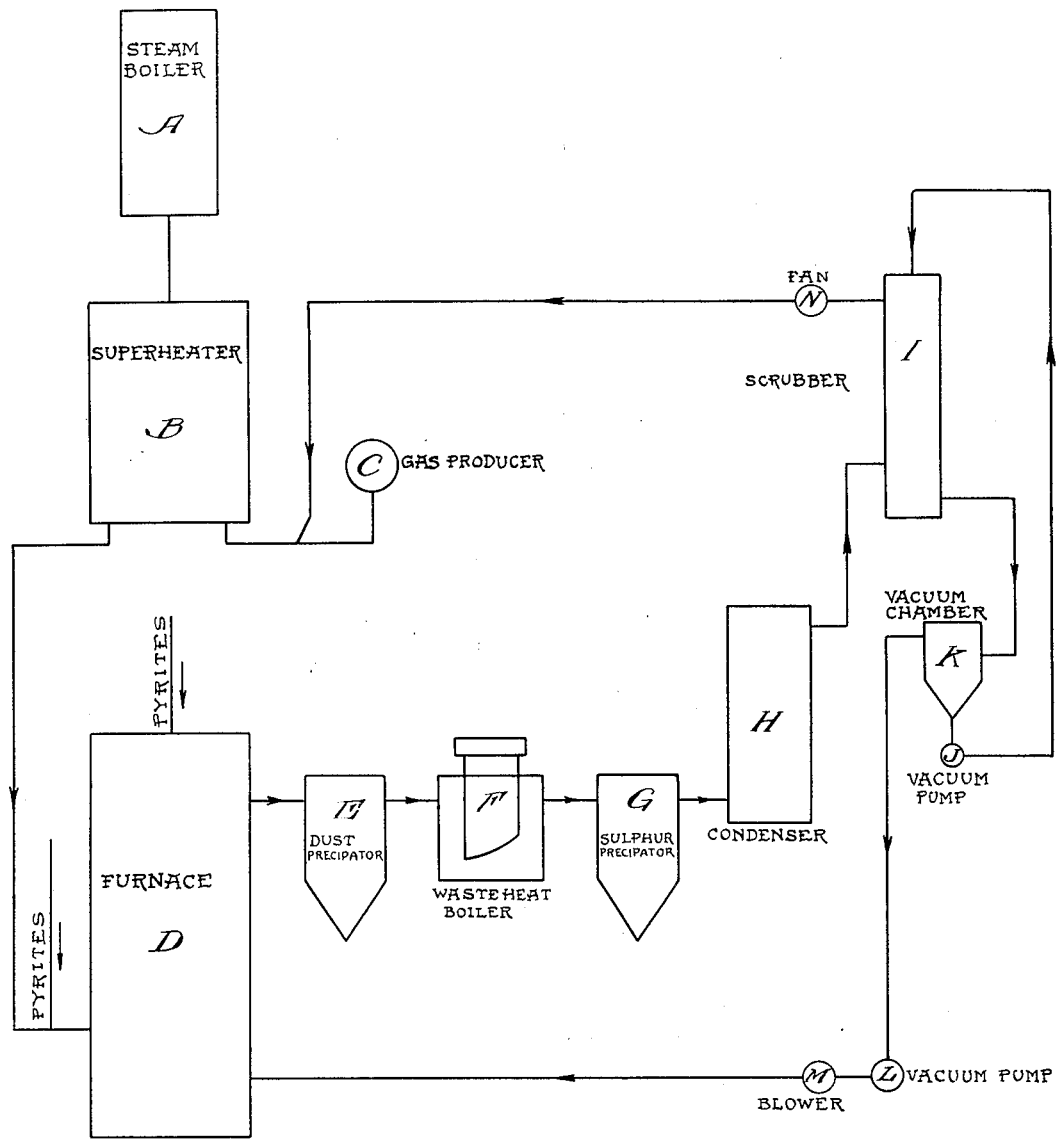
INVENTOR
Louis F. W. Leese,
BY
Pennie Davis Marvin Edmunds
ATTORNEYS

Patented Feb. 20, 1934

1,947,529

UNITED STATES PATENT OFFICE 1,947,529

RECOVERY OF SULPHUR

Louis Frederick William Leese, London, England

Application December 8, 1932, Serial No. 646,295, and in Great Britain December 1, 1931

9 Claims. (Cl. 23—224)

This invention is concerned with the recovery of sulphur from metallic sulphides, sulphur ores, spent oxide and the like.

In accordance with the invention the metallic sulphides or the like are subjected to the action of steam in a reaction chamber, such as a retort or producer, at reaction temperatures between 440° C. and about 1000° C. whereby the steam and the sulphides are mutually decomposed with the formation of oxides of the metals, hydrogen sulphide and free hydrogen, the said reaction temperature being maintained solely by adjustment of the temperature of the said steam and/or by the amount or velocity of the said steam which is admitted at the reaction temperature. The hydrogen sulphide is then decomposed by the heat into sulphur and free hydrogen. Some sulphur dioxide may be formed at the higher temperatures but this in turn reacts with hydrogen sulphide in known manner to form sulphur and water vapour. Part of the sulphur from the metallic sulphides may also be sublimed without entering into the above reactions. The net result of all the operations is that the sulphur originally in combination as metallic sulphides or otherwise is recovered in the form of elemental sulphur, hydrogen being liberated and metallic oxide left behind. Preferably the charge of sulphides or of ore to be treated within the reaction chamber is brought to the required reaction temperature by means of superheated steam alone. The reaction chamber may, however, be brought to the reaction temperature by heating it externally, or internally, after which the necessary steam for carrying out and maintaining the reaction is introduced into the charge.

The sulphides or the like may be and are preferably crushed to powder or flour and in this condition blown into the reaction chamber and carried therethrough by means of the superheated steam. Due to the intimate commingling of the steam and fine dust and the comparatively prolonged exposure of the minute sulphide particles to the steam the reactions take place during the progress of the materials through the chamber.

The vapour and gases leave the reaction chamber carrying the sulphur in a fine state of division or as vapour and are either passed into a condenser or through a precipitator or are treated by both. In using a precipitator the gases and vapours will first be cooled. The sulphur in the vapour phase or in the solid phase may be brought in contact with an alkali or an alkaline earth such as lime or soda or their sulphides or other agent, with the object of removing impurities, e. g. arsenic.

The hydrogen sulphide passing from the condenser or precipitator is returned to the reaction chamber to be decomposed into sulphur and hydrogen.

Varying proportions of hydrogen sulphide are formed by interaction between the hydrogen and sulphur and may leave the reaction chamber with the other products (or may be formed after the gases and vapours leave the chamber and before the sulphur is condensed) the relative quantity of hydrogen sulphide depending on the temperature conditions.

Whatever be the manner of formation of the hydrogen sulphide it is important that this gas should be conserved, since under some conditions of reaction (whether in the reaction chamber or in a subsequent settling or other chamber) as much as one third of the total sulphur may be present in the evolved gases as hydrogen sulphide. This hydrogen sulphide is therefore returned to the reaction chamber. If the water has been condensed as hereinbefore mentioned the hydrogen sulphide is removed in the manner to be described. If, however, an electrostatic precipitator is employed to eliminate the sulphur the steam need not be condensed but may be compressed and reheated and returned to the reaction chamber with the hydrogen sulphide. In this way it is possible to conserve the latent heat of the steam and effect an economy.

At temperatures higher than about 900° C. in the reaction chamber a certain amount of sulphur dioxide is formed. This sulphur dioxide reacts with hydrogen sulphide to form sulphur and water vapour. Polythionic acids may also be formed, but these are returned direct to the reaction chamber or are absorbed by water in the condenser and are progressively decomposed by further hydrogen sulphide with the formation of sulphur and water, so that the quantity of these acids in solution in the condensed water does not build up beyond a low concentration, generally a fraction of one per cent.

The hydrogen may under certain conditions of temperature reduce the metallic oxide to the metal. This is the more likely to happen when the steam and evolved gases are returned uncondensed to the reaction chamber, since the hydrogen will also be returned.

The reaction is endothermic and therefore in order to maintain the reaction temperature, steam must be supplied to the reaction chamber in considerable excess of that entering into the reaction and/or at a higher temperature than that at which the reaction is to be carried out. It would be possible to bring about a less definitely endothermic or even an exothermic reaction by introducing air into the reaction chamber, but it is not within the scope of this invention to use air, since it is found that the oxygen of the air is liable to oxidize the sulphur compounds in preference to the metallic sulphide or oxide of the metal. Air is therefore excluded from the reaction chamber. Such small quantities of air as may be admitted in the boiler-feed-water are not, however, harmful and it is consequently not necessary to de-aerate the boiler-feed-water.

The nature and dimensions of the reaction chamber are determined by the nature of the charge of metallic sulphides or the like. For example, if the temperature of reaction is 900° C. it has been found that pyrites graded to pass a ⅜" sieve and remain on every smaller sieve will give up all its sulphur in about 12 hours, whereas pyrites which has been reduced to a fine dust or powder, so that it can be air-floated or steam-floated, is completely converted in a few seconds. The nature and dimensions of the reaction chamber and the velocities of passage of the reactions must therefore be adjusted so as to give the time of reaction appropriate to the physical condition of the metallic sulphide or the like to be treated. Furthermore, the reaction will take longer to complete the lower be the temperature of reaction, and appropriate adjustment of the reaction conditions must therefore be made in accordance with the temperature at which the reaction is carried out.

In one method of carrying the invention into practice with iron pyrites the pyrites in the form of crushed particles which will pass through a ⅜" screen is charged into the top of the reaction chamber (which may be a retort or producer) and superheated steam at, say, about 900° C. is introduced from below into the charge. The steam is blown in under sufficient pressure to carry it through the charge. At this temperature the steam and the sulphides are decomposed and hydrogen sulphide (which is to a large extent decomposed in the chamber at once to form sulphur and hydrogen) and free hydrogen are formed together with oxides of the metals which pass out at the bottom of the chamber. The process may thus be worked as a continuous process. Any sulphur dioxide formed by the steam at high temperature in its passage upwards through the retort will react in known manner with the hydrogen sulphide, also driven off, to form sulphur.

The mixture of gases and finely divided or vaporous sulphur is then passed through a condenser. The condenser is maintained at such a temperature that water vapour is condensed and the sulphur is consolidated, the hydrogen and the hydrogen sulphide (formed as above mentioned) passing through the condenser. These gases are then brought in contact with water or other suitable liquid in a scrubbing tower, whereby the hydrogen sulphide is absorbed and the hydrogen passes on for further use or treatment. The scrubbing liquid containing the hydrogen sulphide is then passed through a chamber in which a partial vacuum is maintained, for instance by means of a vacuum pump. The hydrogen sulphide is liberated from the scrubbing liquid by the reduced pressure and is then drawn off and forced by means of a blower or otherwise back into the reaction chamber and through the heated charge, where it is decomposed by heat, probably aided by the catalytic action of red hot iron oxide resulting from the decomposition of the sulphide or, with the formation of hydrogen and sulphur.

The scrubbing liquid from which the hydrogen sulphide has been extracted by reduced pressure may, if desired, be recirculated in the scrubbing tower, where it absorbs a further quantity of hydrogen sulphide.

The hydrogen freed from hydrogen sulphide as above, is used as fuel to assist in raising and superheating steam for the process. Alternatively, when a more profitable outlet exists it may be disposed of as hydrogen.

I may, and preferably do, however, carry out the process with sulphides in the form of powder or flour or dust. In such case I use as the reaction chamber a well-insulated retort or furnace of sufficient height to allow the above-mentioned reactions to take place whilst the particles are in suspension in the chamber. Prior to the treatment of the sulphide the reaction chamber is preferably heated by means of hot flue gases to the reaction temperature of about 900° C. When the pyrites is used in the form of dust or flour of such a degree of fineness that it can be carried by the steam this material is introduced near the bottom of the reaction chamber with the steam. Preferably only part of the steam required to bring about and maintain the reaction is used to inject the pyrites, since in this way it is possible to effect a better adjustment of the relative amounts and velocities of the pyrites and of the steam respectively.

When somewhat coarser particles are to be treated the material may be fed in as a shower of dust from the upper part of the retort and the steam fed in from below. Where pyrites is used in the form of dust or flour as above defined, the iron oxide is largely carried over with the steam, sulphur and other products of the reaction and passes with them into a larger chamber in which the velocity is decreased and the iron oxide drops out. Such a settling chamber may also conveniently be used when the above mentioned somewhat coarser particles are treated. The gases and vapours then pass on and are treated as already described. The iron oxide particles may, however, in a preferred method be removed from the hot gases and vapours by electrostatic precipitation at a temperature higher than that at which sulphur can be precipitated by this means (i. e. above the boiling point of sulphur) and the sulphur afterwards precipitated in a second electrostatic precipitator at a suitable temperature or by agglomeration in a condenser as described.

The reactions going on in the reaction chamber and between the reaction chamber and the sulphur condenser are in part reversible and are probably more complex than are revealed by the resultant reaction products or by the reactions described, but the final result is essentially as described, i. e. the products leaving the retort are in the main sulphur, hydrogen, hydrogen sulphide and water vapour, the hydrogen sulphide being returned through the reaction chamber and converted to further sulphur and hydrogen.

An illustrative embodiment of the present inventive concept is hereinafter described in connection with the accompanying flowsheet.

In the flowsheet, A is a steam boiler, and B a superheater fired by means of the gas producer C. Superheated steam passes from the superheater to a retort or furnace D, which is charged with pyrites ore. Gaseous and vaporous products from D pass through a dust precipitator E and then through a waste heat boiler F to a sulphur precipitator (electrostatic or otherwise) G, where the sulphur is removed. Excess steam, hydrogen, and hydrogen sulphide, pass into a condenser H, where the steam is condensed by means of water. (When an electrostatic precipitator is not employed G and H may be only one piece of apparatus). Hydrogen and hydrogen sulphide pass into scrubber I, where H2S is removed by scrubbing with water. The water, charged with H2S, is drawn by means of a pump J into a vacuum chamber K, in which a reduced pressure is maintained by vacuum pump L. By this means some or most of the H2S is drawn out of its aqueous solution and passed by means of blower M to the retort or furnace, at a point below the superheated steam inlet. Hydrogen is drawn from top of scrubber I by fan N and may be passed together with producer gases into superheater B to be burned.

I claim:

1. A process for the recovery of sulphur from metallic sulphides, sulphur ores, spent oxide and like material consisting in subjecting the material to the action of superheated steam in a reaction chamber at a reaction temperature between 440° C. and 1000° C., maintaining said temperature substantially solely by adjustment of the temperature of the said steam and by the relative amount at the reaction temperature of the said steam, and recirculating excess hydrogen sulphide to the reaction chamber, whereby the steam and the material are mutually decomposed forming inter alia free hydrogen and sulphur, and removing the sulphur evolving.

2. A process for the recovery of sulphur from metallic sulphides, sulphur ores, spent oxide and like material, consisting in subjecting the material to the action of superheated steam in a reaction chamber at a reaction temperature between 440° C. and 1000° C., maintaining said temperature substantially solely by adjustment of the temperature of the said steam and by the relative amount at the reaction temperature of the said steam, and recirculating excess hydrogen sulphide to the reaction chamber, whereby the steam and sulphide are mutually decomposed forming inter alia free hydrogen and sulphur, separating the sulphur from the gases or vapours evolving and utilizing the hydrogen resulting from the reaction to generate or superheat the said steam.

3. A process for the recovery of sulphur from metallic sulphides, sulphur ores, spent oxide and like material, consisting in subjecting the material to the action of superheated steam in a reaction chamber at a reaction temperature between 440° C. and 1000° C., maintaining said temperature substantially solely by adjustment of the temperature of the said steam and by the relative amount at the reaction temperature of the said steam and recirculating the excess hydrogen sulphide to the reaction chamber, whereby the steam and sulphide are mutually decomposed forming free hydrogen and sulphur, and removing the sulphur evolving in a condenser.

4. A process for the recovery of sulphur from metallic sulphides, sulphur ores, spent oxide, and like material consisting in subjecting the material to the action of superheated steam in a reaction chamber at a reaction temperature between 440° C. and 1000° C., maintaining said temperature substantially solely by adjustment of the temperature of the said steam and by the relative amount at the reaction temperature of the said steam, removing the sulphur electrostatically from the gases and vapours evolving and recirculating excess hydrogen sulphide to the reaction chamber.

5. A process for the recovery of sulphur from metallic sulphides, spent oxides and like material, consisting in subjecting the material to the action of superheated steam in a reaction chamber at a reaction temperature between 440° C. and 1000° C., removing the sulphur from the evolving gases and vapours, scrubbing the gases and vapours for removal of hydrogen sulphide, removing the hydrogen sulphide from the scrubbing liquid under reduced pressure and pumping the hydrogen sulphide thus recovered under elevated pressure into the reaction chamber.

6. A process for the recovery of sulphur from metallic sulphides, sulphur ores, spent oxides and like material consisting in injecting the material by means of steam into a reaction chamber maintained at a reaction temperature between 440° C. and 1000° C., maintaining said temperature substantially solely by the temperature of introduced steam and by the relative amount at the reaction temperature of the steam, removing the sulphur from the evolving gases and vapours, and recirculating excess hydrogen sulphide to the reaction chamber.

7. A process for the recovery of sulphur from metallic sulphides, sulphur ores, spent oxide and like material, consisting in injecting the material by means of steam into a reaction chamber maintained at a reaction temperature between 440° C. and 1000° C., maintaining said temperature substantially solely by the temperature of introduced steam and by the relative amount at the reaction temperature of the steam, removing the sulphur electrostatically from the evolving gases and vapours, and recirculating excess hydrogen sulphide to the reaction chamber.

8. A process for the recovery of sulphur from metallic sulphides, sulphur ores, spent oxide and like material, consisting in injecting the material by means of steam into a reaction chamber, wherein a reaction temperature of about 900° C. is maintained solely by introducing an amount of steam at about 900° C. in excess of that required to cause the evolution of all the available sulphur as sulphur, removing the metallic or metallic oxide residue by means of an electrostatic precipitator, removing the sulphur from the evolved gases or vapours and returning the hydrogen sulphide remaining in the evolved gases or vapours after removal of the sulphur to the reaction chamber.

9. A process for the recovery of sulphur from metallic sulphides, sulphur ores, spent oxide and like material, consisting in injecting the material by means of steam into a reaction chamber, wherein a reaction temperature of about 900° C. is maintained solely by introducing steam at a temperature in excess of 900° C., removing the metallic or metallic oxide residue by means of an elestrostatic precipitator, removing the sulphur in the solid or liquid form from the evolved gases or vapours by means of an electrostatic precipitator or a condenser and returning the hydrogen sulphide remaining in the evolved gases or vapours after removal of the sulphur to the reaction chamber.

LOUIS FREDERICK WILLIAM LEESE.